US012490339B2

(12) United States Patent
Damnjanovic et al.

(10) Patent No.: US 12,490,339 B2
(45) Date of Patent: Dec. 2, 2025

(54) TECHNIQUES FOR REMOTE RADIO HEAD CONFIGURATION FOR USER EQUIPMENT

(71) Applicant: QUALCOMM Incorporated, San Diego, CA (US)

(72) Inventors: Aleksandar Damnjanovic, Del Mar, CA (US); Srinivas Yerramalli, Hyderabad (IN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 17/303,818

(22) Filed: Jun. 8, 2021

(65) Prior Publication Data

US 2022/0394815 A1 Dec. 8, 2022

(51) Int. Cl.
*H04W 80/02* (2009.01)
*H04W 28/02* (2009.01)
*H04W 52/36* (2009.01)
*H04W 88/08* (2009.01)

(52) U.S. Cl.
CPC ........ *H04W 80/02* (2013.01); *H04W 28/0278* (2013.01); *H04W 52/365* (2013.01); *H04W 88/08* (2013.01)

(58) Field of Classification Search
None
See application file for complete search history.

(56) References Cited

U.S. PATENT DOCUMENTS

| 2003/0039270 | A1* | 2/2003 | Chang | H04L 1/1671 370/496 |
| 2006/0186973 | A1* | 8/2006 | Satou | H04B 1/40 333/260 |
| 2011/0080881 | A1* | 4/2011 | Hsu | H04W 52/365 370/329 |
| 2011/0158114 | A1* | 6/2011 | Novak | H04J 3/0644 370/252 |
| 2013/0265979 | A1* | 10/2013 | Yamaguchi | H04W 72/52 370/329 |
| 2014/0128092 | A1* | 5/2014 | Xiong | H04W 16/32 455/454 |

(Continued)

FOREIGN PATENT DOCUMENTS

WO 2022040652 A1 2/2022

OTHER PUBLICATIONS

International Search Report and Written Opinion—PCT/US2022/072278—ISA/EPO—Sep. 14, 2022.

*Primary Examiner* — Wutchung Chu
*Assistant Examiner* — Berhanu D Belete
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may transmit, to a remote radio head (RRH), a protocol configuration, wherein the protocol configuration configures the RRH to perform one or more MAC protocol layer functions of the UE. The UE may perform a communication, wherein one or more higher layer functions associated with the communication are performed by the UE, wherein the one or more higher layer functions are associated with a higher layer than the MAC protocol layer. Numerous other aspects are described.

30 Claims, 9 Drawing Sheets

(56) References Cited

U.S. PATENT DOCUMENTS

| | | | |
|---|---|---|---|
| 2014/0362829 A1* | 12/2014 | Kazmi | H04N 21/26208 370/332 |
| 2015/0043534 A1* | 2/2015 | Shirota | H04W 84/042 370/331 |
| 2015/0327115 A1* | 11/2015 | Park | H04W 80/02 370/328 |
| 2015/0358838 A1* | 12/2015 | Wei | H04W 72/56 370/228 |
| 2015/0373523 A1* | 12/2015 | Jeong | H04L 41/5029 455/406 |
| 2016/0029245 A1* | 1/2016 | Hong | H04W 28/0252 370/329 |
| 2017/0070914 A1* | 3/2017 | Chun | H04W 4/70 |
| 2017/0208607 A1* | 7/2017 | Quan | H04L 1/1887 |
| 2017/0222819 A1* | 8/2017 | Jeong | H04W 12/086 |
| 2018/0263076 A1* | 9/2018 | Andreoli-Fang | H04W 88/10 |
| 2018/0324674 A1* | 11/2018 | Raval | H04W 12/062 |
| 2018/0343646 A1* | 11/2018 | Chou | H04W 16/14 |
| 2018/0343684 A1* | 11/2018 | Xu | H04W 74/002 |
| 2019/0075438 A1 | 3/2019 | Kuo et al. | |
| 2019/0215717 A1* | 7/2019 | Lee | H04W 76/19 |
| 2019/0253942 A1* | 8/2019 | Yoo | H04W 80/08 |
| 2019/0349139 A1* | 11/2019 | Park | H04W 76/11 |
| 2020/0053605 A1 | 2/2020 | Dahod et al. | |
| 2020/0120576 A1* | 4/2020 | Luo | H04W 76/11 |
| 2020/0187296 A1* | 6/2020 | Kim | H04W 4/70 |
| 2020/0228287 A1* | 7/2020 | Lou | H04L 1/1822 |
| 2020/0229206 A1* | 7/2020 | Badic | G05D 1/225 |
| 2020/0260524 A1* | 8/2020 | Kim | H04L 69/04 |
| 2020/0280866 A1* | 9/2020 | Nader | H04W 68/005 |
| 2020/0288394 A1* | 9/2020 | Chhabra | H04W 52/241 |
| 2020/0296696 A1 | 9/2020 | Goldhamer | |
| 2020/0359225 A1 | 11/2020 | Goldhamer | |
| 2020/0404698 A1* | 12/2020 | Yi | H04L 69/321 |
| 2021/0044989 A1 | 2/2021 | Sekar et al. | |
| 2021/0045070 A1* | 2/2021 | Yi | H04W 72/0446 |
| 2021/0045182 A1* | 2/2021 | Raghunathan | H04W 76/27 |
| 2021/0135770 A1* | 5/2021 | Schober | H04L 5/14 |
| 2021/0266788 A1* | 8/2021 | Takano | H04W 88/08 |
| 2021/0352521 A1* | 11/2021 | Pan | H04L 47/805 |
| 2021/0352688 A1* | 11/2021 | Luo | H04W 72/1268 |
| 2022/0053413 A1* | 2/2022 | Damnjanovic | H04W 48/18 |
| 2022/0159427 A1* | 5/2022 | Fang | H04W 4/38 |
| 2022/0394815 A1* | 12/2022 | Damnjanovic | H04W 24/02 |
| 2023/0041246 A1* | 2/2023 | You | H04W 76/27 |
| 2023/0337213 A1* | 10/2023 | Badic | G05D 1/467 |
| 2023/0362686 A1* | 11/2023 | Geng | H04W 24/02 |

* cited by examiner

TECHNIQUES FOR REMOTE RADIO HEAD CONFIGURATION FOR USER EQUIPMENT

FIELD OF THE DISCLOSURE

Aspects of the present disclosure generally relate to wireless communication and to techniques and apparatuses for remote radio head configuration for user equipment.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a base station via the downlink and uplink. "Downlink" (or "forward link") refers to the communication link from the base station to the UE, and the "uplink" (or "reverse link") refers to the communication link from the UE to the base station. As will be described in more detail herein, a base station may be referred to as a Node B, a gNB, an access point (AP), a radio head, a transmit receive point (TRP), a New Radio (NR) base station, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting, to a remote radio head (RRH), a protocol configuration, wherein the protocol configuration configures the RRH to perform one or more medium access control (MAC) protocol layer functions of the UE; and performing a communication, wherein one or more higher layer functions associated with the communication are performed by the UE, wherein the one or more higher layer functions are associated with a higher layer than the MAC protocol layer.

In some aspects, the one or more MAC protocol layer functions that are configured to be performed by the RRH include power headroom reporting.

In some aspects, the one or more MAC protocol layer functions that are configured to be performed by the RRH include all MAC protocol layer functions of the UE.

In some aspects, the method includes performing, for the communication, a MAC protocol layer function other than the one or more MAC protocol layer functions.

In some aspects, the MAC protocol layer function includes buffer status reporting.

In some aspects, the MAC protocol layer function includes power headroom reporting.

In some aspects, one or more radio link control (RLC) protocol layer functions are configured to be performed at the RRH based at least in part on the protocol configuration.

In some aspects, the one or more RLC layer functions include all RLC layer functions of the UE.

In some aspects, the method includes performing an RLC reset based at least in part on attaching to the RRH.

In some aspects, the method includes transferring an RLC state to the RRH based at least in part on transmitting the protocol configuration to the RRH.

In some aspects, the one or more higher layer functions include at least one of: a radio link control function, a packet data convergence protocol function, a service data adaptation protocol function, or a radio resource control function.

In some aspects, the transmission of the protocol configuration is via an access link between the UE and the RRH, and the communication is between the UE and a base station via the RRH and the access link.

In some aspects, a method of wireless communication performed by an RRH includes receiving, from a UE, a protocol configuration, wherein the protocol configuration configures the RRH to perform one or more MAC protocol layer functions of the UE; and performing the one or more MAC protocol layer functions for a communication between the UE and a base station.

In some aspects, the one or more MAC protocol layer functions include power headroom reporting.

In some aspects, the one or more MAC protocol layer functions include all MAC protocol layer functions of the UE.

In some aspects, the method includes transmitting buffer status reporting generated by the UE.

In some aspects, the method includes transmitting power headroom reporting generated by the UE.

In some aspects, the method includes performing one or more RLC layer functions for the communication based at least in part on the protocol configuration.

In some aspects, the one or more RLC layer functions include all RLC layer functions of the UE.

In some aspects, the method includes receiving an RLC state from the UE based at least in part on the protocol configuration.

In some aspects, the reception of the protocol configuration is via an access link between the UE and the RRH, and the communication between the UE and the base station occurs via the RRH and via a backhaul link or a direct link between the RRH and the base station.

In some aspects, a method, device, apparatus, computer program product, non-transitory computer-readable medium, user equipment, base station, node, wireless communication device, and/or processing system as substantially described herein with reference to and as illustrated by the accompanying drawings, specification, and appendix.

In some aspects, a UE for wireless communication includes a memory and one or more processors, coupled to the memory, configured to: transmit, to an RRH, a protocol configuration, wherein the protocol configuration configures the RRH to perform one or more MAC protocol layer functions of the UE; and perform a communication, wherein one or more higher layer functions associated with the communication are performed by the UE, wherein the one or more higher layer functions are associated with a higher layer than the MAC protocol layer.

In some aspects, the one or more MAC protocol layer functions that are configured to be performed by the RRH include power headroom reporting.

In some aspects, the one or more MAC protocol layer functions that are configured to be performed by the RRH include all MAC protocol layer functions of the UE.

In some aspects, the one or more processors are further configured to: perform, for the communication, a MAC protocol layer function other than the one or more MAC protocol layer functions.

In some aspects, the MAC protocol layer function includes buffer status reporting.

In some aspects, the MAC protocol layer function includes power headroom reporting.

In some aspects, one or more RLC layer functions are configured to be performed at the RRH based at least in part on the protocol configuration.

In some aspects, the one or more RLC layer functions include all RLC layer functions of the UE.

In some aspects, the one or more processors are further configured to: perform an RLC reset based at least in part on attaching to the RRH.

In some aspects, the one or more processors are further configured to: transfer an RLC state to the RRH based at least in part on transmitting the protocol configuration to the RRH.

In some aspects, the one or more higher layer functions include at least one of: a radio link control function, a packet data convergence protocol function, a service data adaptation protocol function, or a radio resource control function.

In some aspects, the transmission of the protocol configuration is via an access link between the UE and the RRH, and the communication is between the UE and a base station via the RRH and the access link.

In some aspects, a RRH for wireless communication includes a memory and one or more processors, coupled to the memory, configured to: receive, from a UE, a protocol configuration, wherein the protocol configuration configures the RRH to perform one or more MAC protocol layer functions of the UE; and perform the one or more MAC protocol layer functions for a communication between the UE and a base station.

In some aspects, the one or more MAC protocol layer functions include power headroom reporting.

In some aspects, the one or more MAC protocol layer functions include all MAC protocol layer functions of the UE.

In some aspects, the one or more processors are further configured to: transmit buffer status reporting generated by the UE.

In some aspects, the one or more processors are further configured to: transmit power headroom reporting generated by the UE.

In some aspects, the one or more processors are further configured to: perform one or more RLC layer functions for the communication based at least in part on the protocol configuration.

In some aspects, the one or more RLC layer functions include all RLC layer functions of the UE.

In some aspects, the one or more processors are further configured to receive an RLC state from the UE based at least in part on the protocol configuration.

In some aspects, the reception of the protocol configuration is via an access link between the UE and the RRH, and the communication between the UE and the base station occurs via the RRH and via a backhaul link or a direct link between the RRH and the base station.

In some aspects, a non-transitory computer-readable medium storing a set of instructions for wireless communication includes one or more instructions that, when executed by one or more processors of a UE, cause the UE to: transmit, to an RRH, a protocol configuration, wherein the protocol configuration configures the RRH to perform one or more MAC protocol layer functions of the UE; and perform a communication, wherein one or more higher layer functions associated with the communication are performed by the UE, wherein the one or more higher layer functions are associated with a higher layer than the MAC protocol layer.

In some aspects, the one or more instructions further cause the UE to power headroom reporting.

In some aspects, the one or more MAC protocol layer functions that are configured to be performed by the RRH include all MAC protocol layer functions of the UE.

In some aspects, the one or more instructions further cause the UE to perform, for the communication, a MAC protocol layer function other than the one or more MAC protocol layer functions.

In some aspects, the one or more MAC protocol layer functions include buffer status reporting.

In some aspects, the one or more MAC protocol layer functions include power headroom reporting.

In some aspects, one or more RLC layer functions are configured to be performed at the RRH based at least in part on the protocol configuration.

In some aspects, the one or more RLC layer functions include all RLC layer functions of the UE.

In some aspects, the one or more instructions further cause the UE to perform an RLC reset based at least in part on attaching to the RRH.

In some aspects, the one or more instructions further cause the UE to transfer an RLC state to the RRH based at least in part on transmitting the protocol configuration to the RRH.

In some aspects, the one or more higher layer functions include at least one of: a radio link control function, a packet data convergence protocol function, a service data adaptation protocol function, or a radio resource control function.

In some aspects, the transmission of the protocol configuration is via an access link between the UE and the RRH, and the communication is between the UE and a base station via the RRH and the access link.

In some aspects, a non-transitory computer-readable medium storing a set of instructions for wireless communication includes one or more instructions that, when executed by one or more processors of an RRH, cause the RRH to: receive, from a UE, a protocol configuration, wherein the protocol configuration configures the RRH to perform one or more MAC protocol layer functions of the UE; and perform the one or more MAC protocol layer functions for a communication between the UE and a base station.

In some aspects, the one or more instructions further cause the RRH to power headroom reporting.

In some aspects, the one or more MAC protocol layer functions include all MAC protocol layer functions of the UE.

In some aspects, the one or more instructions further cause the RRH to transmit buffer status reporting generated by the UE.

In some aspects, the one or more instructions further cause the RRH to: transmit power headroom reporting generated by the UE.

In some aspects, the one or more instructions further cause the RRH to: perform one or more RLC layer functions for the communication based at least in part on the protocol configuration.

In some aspects, the one or more RLC layer functions include all RLC layer functions of the UE.

In some aspects, the one or more instructions further cause the RRH to receive an RLC state from the UE based at least in part on the protocol configuration.

In some aspects, the reception of the protocol configuration is via an access link between the UE and the RRH, and the communication between the UE and the base station occurs via the RRH and via a backhaul link or a direct link between the RRH and the base station.

In some aspects, an apparatus for wireless communication includes means for transmitting, to an RRH, a protocol configuration, wherein the protocol configuration configures the RRH to perform one or more MAC protocol layer functions of the UE; and means for performing a communication, wherein one or more higher layer functions associated with the communication are performed by the UE, wherein the one or more higher layer functions are associated with a higher layer than the MAC protocol layer.

In some aspects, the apparatus includes means for powering headroom reporting.

In some aspects, the one or more MAC protocol layer functions that are configured to be performed by the RRH include all MAC protocol layer functions of the UE.

In some aspects, the apparatus includes means for performing, for the communication, a MAC protocol layer function other than the one or more MAC protocol layer functions.

In some aspects, the one or more MAC protocol layer functions include buffer status reporting.

In some aspects, the one or more MAC protocol layer functions include power headroom reporting.

In some aspects, one or more RLC layer functions are configured to be performed at the RRH based at least in part on the protocol configuration.

In some aspects, the one or more RLC layer functions include all RLC layer functions of the UE.

In some aspects, the apparatus includes means for performing an RLC reset based at least in part on attaching to the RRH.

In some aspects, the apparatus includes means for transferring an RLC state to the RRH based at least in part on transmitting the protocol configuration to the RRH.

In some aspects, the one or more higher layer functions include at least one of: a radio link control function, a packet data convergence protocol function, a service data adaptation protocol function, or a radio resource control function.

In some aspects, the transmission of the protocol configuration is via an access link between the UE and the RRH, and the communication is between the UE and a base station via the RRH and the access link.

In some aspects, an apparatus for wireless communication includes means for receiving, from a UE, a protocol configuration, wherein the protocol configuration configures the RRH to perform one or more MAC protocol layer functions of the UE; and means for performing the one or more MAC protocol layer functions for a communication between the UE and a base station.

In some aspects, the one or more MAC protocol layer functions include power headroom reporting.

In some aspects, the one or more MAC protocol layer functions include all MAC protocol layer functions of the UE.

In some aspects, the apparatus includes means for transmitting buffer status reporting generated by the UE.

In some aspects, the apparatus includes means for transmitting power headroom reporting generated by the UE.

In some aspects, the apparatus includes means for performing one or more RLC layer functions for the communication based at least in part on the protocol configuration.

In some aspects, the one or more RLC layer functions include all RLC layer functions of the UE.

In some aspects, the apparatus includes means for receiving an RLC state from the UE based at least in part on the protocol configuration.

In some aspects, the reception of the protocol configuration is via an access link between the UE and the RRH, and the communication between the UE and the base station occurs via the RRH and via a backhaul link or a direct link between the RRH and the base station.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
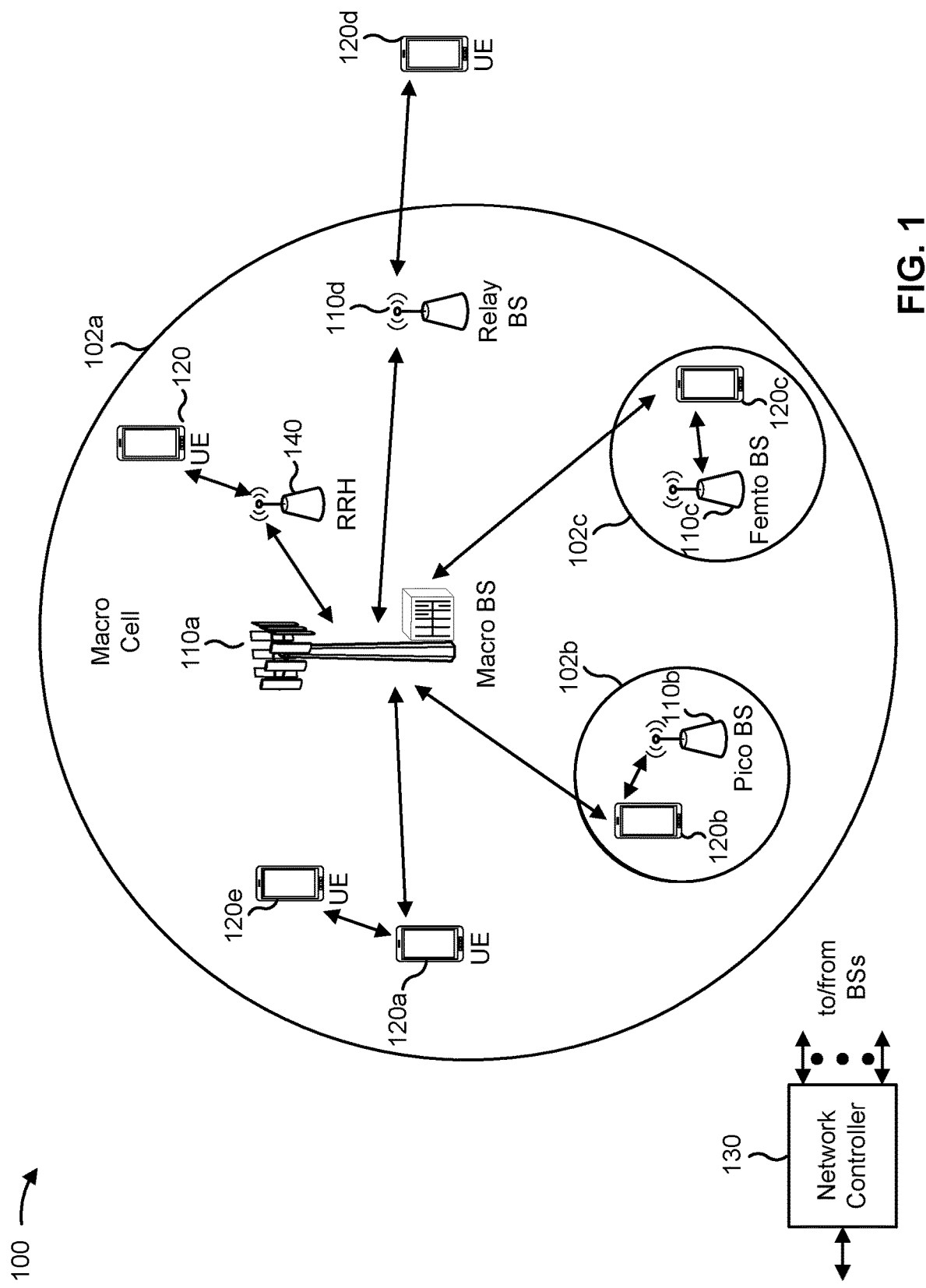
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR base station, a Node B, a gNB, a 5G node B (NB), an access point, a transmit receive point (TRP), or the like. Each base station may provide communication coverage for a particular geographic area. In 3GPP, the term "cell" can refer to a coverage area of a base station and/or a base station subsystem serving this coverage area, depending on the context in which the term is used.

A base station may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A base station for a macro cell may be referred to as a macro base station. A base station for a pico cell may be referred to as a pico base station. A base station for a femto cell may be referred to as a femto base station or a home base station. In the example shown in FIG. 1, a base station 110a may be a macro base station for a macro cell 102a, a base station 110b may be a pico base station for a pico cell 102b, and a base station 110c may be a femto base station for a femto cell 102c. A base station may support one or multiple (e.g., three) cells. The terms "eNB", "base station", "NR base station", "gNB", "TRP", "AP", "node B", "5G NB", and "cell" may be used interchangeably herein.

In some aspects, a cell may not necessarily be stationary, and the geographic area of the cell may move according to the location of a mobile base station. In some aspects, the base stations may be interconnected to one another and/or to one or more other base stations or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a base station or a UE) and send a transmission of the data to a downstream station (e.g., a UE or a base station). A relay station may also be a UE that can relay transmissions for other UEs. In the example shown in FIG. 1, a relay base station 110d may communicate with macro base station 110a and a UE 120d in order to facilitate communication between base station 110a and UE 120d. A relay base station may also be referred to as a relay station, a relay base station, a relay, or the like.

Wireless network 100 may be a heterogeneous network that includes base stations of different types, such as macro base stations, pico base stations, femto base stations, relay base stations, or the like. These different types of base stations may have different transmit power levels, different coverage areas, and different impacts on interference in wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to a set of base stations and may provide coordination and control for these base stations. Network controller 130 may communicate with the base stations via a backhaul. The base stations may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, a UE 120 may be associated with an RRH 140. The RRHs described herein (e.g., RRH 140) generally represent a cooperative transceiver. An RRH 140 may provide communication functions for communication between the UE 120 and a BS 110. For example, as described elsewhere herein, an RRH 140 may handle one or more physical layer functions, medium access control layer functions, radio link control layer functions, or the like, for the UE 120. In some aspects, an RRH 140 may include one or more components of a UE 120 or a BS 110, such as an antenna (e.g., an antenna panel), one or more processors, one or more memories, or the like.

As indicated above, FIG. 1 is provided as an example. Other examples may differ from what is described with regard to FIG. 1.

Figure 2:
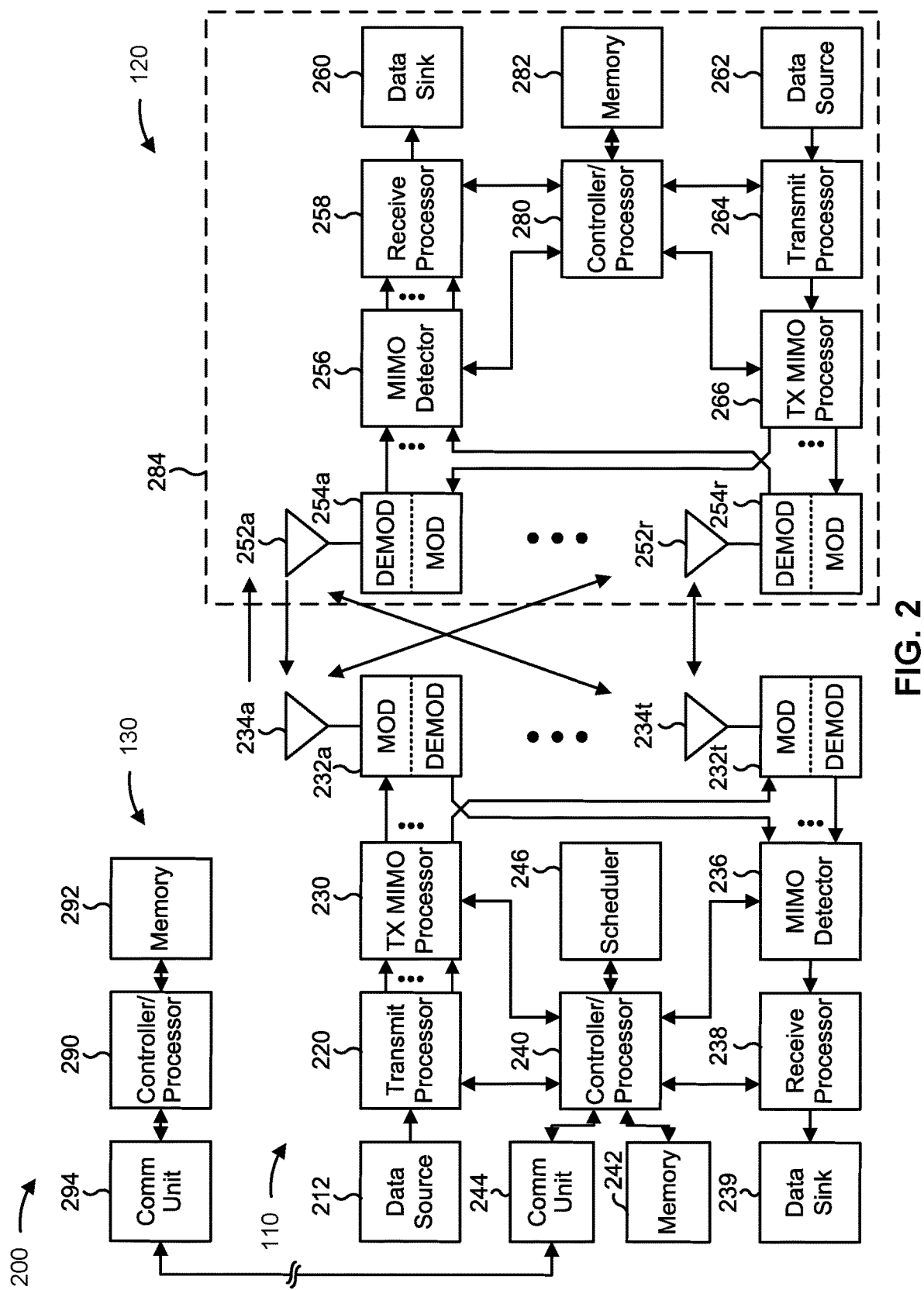
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-9).

Controller/processor 240 of base station 110, controller/processor 280 of UE 120, and/or any other component(s) of FIG. 2 may perform one or more techniques associated with remote radio head (RRH) configuration for a user equipment, as described in more detail elsewhere herein. In some aspects, the RRH described herein is a base station 110, is included in a base station 110, or includes one or more components of a base station 110 shown in FIG. 2. In some aspects, the RRH described herein is a UE 120, is included in a UE 120, or includes one or more components of a UE 120 shown in FIG. 2. In one example, the RRH described herein is a UE 120 that, when idle (e.g., when in an idle mode, when in an inactive mode, or the like), acts as an RRH for another UE 120.

Figure 6:
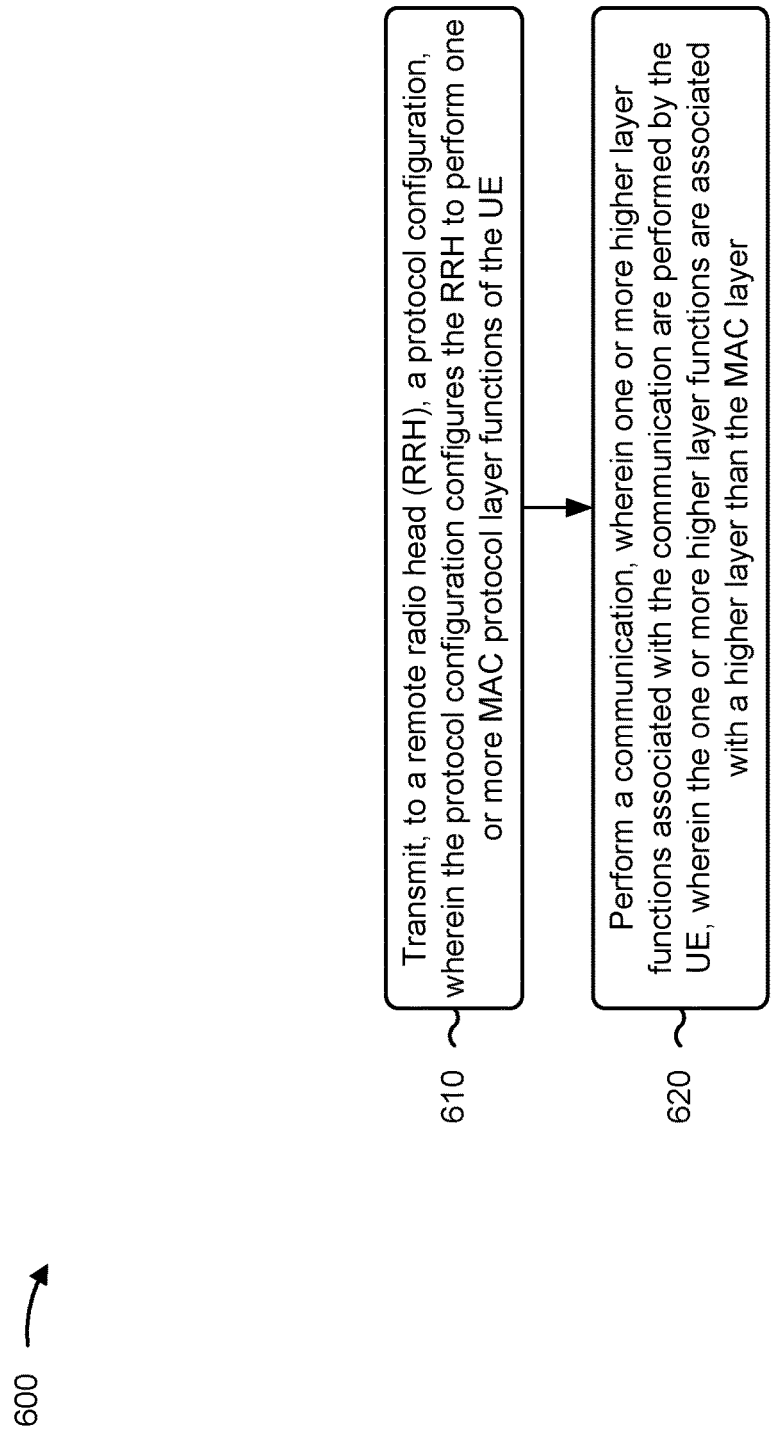
FIGS. 6 and 7 are diagrams illustrating example processes associated with remote radio head configuration for a user equipment, in accordance with the present disclosure.
Figure 7:
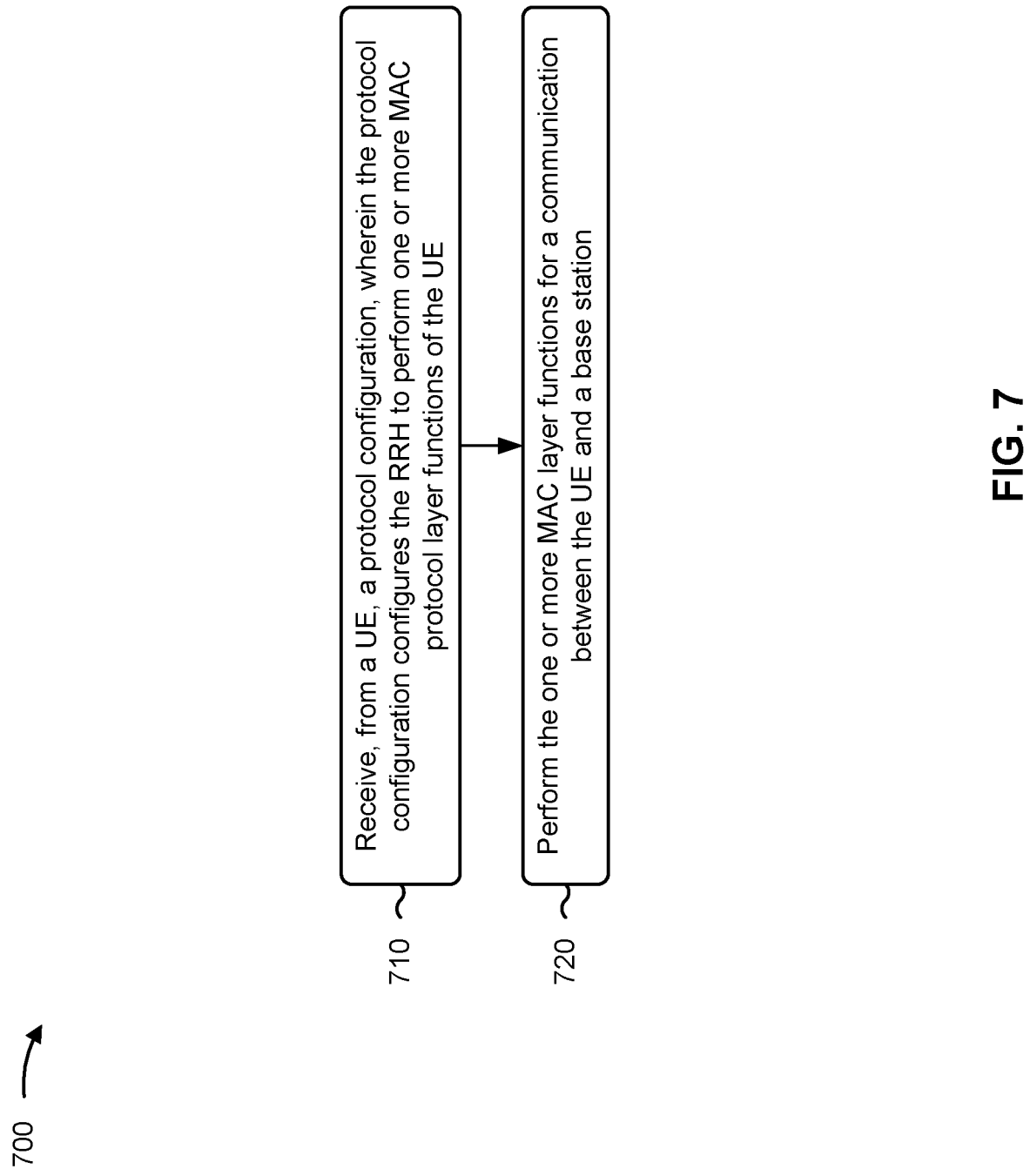

Controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions.

In some aspects, the UE includes means for transmitting, to an RRH, a protocol configuration, wherein the protocol configuration configures the RRH to perform one or more MAC protocol layer functions of the UE; and/or means for performing a communication, wherein one or more higher layer functions associated with the communication are performed by the UE, wherein the one or more higher layer functions are associated with a higher layer than the MAC protocol layer. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the RRH includes means for receiving, from a UE, a protocol configuration, wherein the protocol configuration configures the RRH to perform one or more MAC protocol layer functions of the UE; and/or means for performing the one or more MAC protocol layer functions for a communication between the UE and a base station. In some aspects, the means for the RRH to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the RRH to perform operations described herein may include, for example, one or more of antenna 252, demodulator 254, MIMO detector 256, receive processor 258, transmit processor 264, TX MIMO processor 266, modulator 254, controller/processor 280, or memory 282.

As indicated above, FIG. 2 is provided as an example. Other examples may differ from what is described with regard to FIG. 2.

Figure 3:
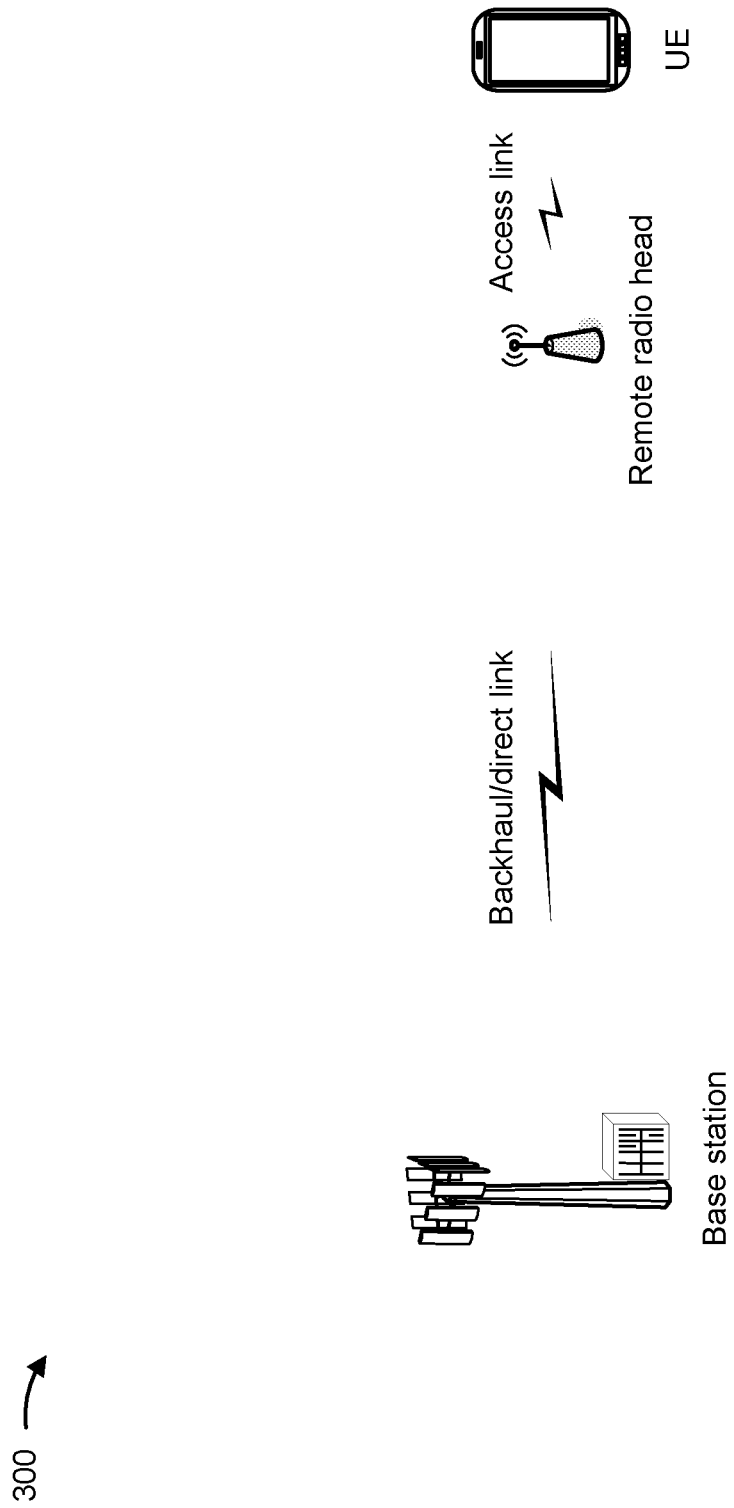
FIG. 3 is a diagram illustrating an example of remote radio head communications, in accordance with the present disclosure.

FIG. 3 is a diagram illustrating an example 300 of remote radio head communications, in accordance with the present disclosure. Example 300 includes a base station (e.g., BS 110), a UE (e.g., UE 120), and an RRH (e.g., RRH 140). The RRH may extend coverage of the UE. For example, the RRH may handle physical-layer communication (e.g., radio communication) with the base station, and in some aspects, may handle one or more medium access control (MAC) protocol layer functions and/or radio link control (RLC) protocol layer functions of the UE. In some aspects, the RRH may be considered an extension of the UE. For example, the base station may transmit communications to the RRH, and it may be up to the UE to handle communication between the RRH and the UE. In some aspects, an RRH may be referred to as a UE RRH, a cooperating transceiver, a relay, or the like. The RRH may be associated with the UE, such as via a UE to RRH association procedure or a UE RRH discovery procedure. A UE associated with an RRH may be referred to as a cooperating UE of the RRH. In some aspects, the RRH may be a UE, a CPE, a base station, one or more components of a UE, a BS, and/or a CPE, or the like.

As shown in FIG. 3, and by example 300, the base station may communicate with the UE via the RRH. The RRH may be capable of at least wireless communication with the UE and the base station. In some aspects, the RRH may communicate with the base station using a backhaul link or a direct link. For example, the RRH may communicate with the base station using a wireless backhaul (e.g., IAB, backhaul adaptation protocol, or the like) in accordance with a 5G/NR protocol. In some aspects, the RRH may communicate with the UE using an access link (e.g., a band 2 access link, using IEEE 802.11 communications and/or 5G communications, among other examples).

In some situations, the base station may not be aware of a presence of relays (e.g., the RRH) between the base station and the UE. In addition, an association between RRH and UE may be network independent. For example, an RRH may be deployed and maintained by a property owner for use with UEs deployed by the property owner and/or customers of the property owner. In other words, in some cases, an RRH may not be deployed by an operator of the base station.

As indicated above, FIG. 3 is provided as an example. Other examples may differ from what is described with respect to FIG. 3.

Relaying between a UE and a network can be handled via various forms of relays. One form of relay is a Layer 3 relay, which is a network-aware and controlled form of relay. A Layer 3 relay may be configured and controlled by a base station, which introduces overhead and requires significant capabilities at the Layer 3 relay. Another form of relay is a Layer 1 relay. For a Layer 1 relay, a base station does not need to be aware of the presence of a Layer 1 relay. A Layer 1 relay's architecture involves end-to-end communication in the medium access control (MAC) protocol layer and above (that is, without handling MAC or above processing at the Layer 1 relay). Layer 1 relaying may involve a significant processing burden at the UE associated with a Layer 1 relay, since the UE may still handle all MAC and above processing.

Some aspects described herein enable configuration of an RRH, which may enable various communications between the RRH, a base station, and a UE. For example, a UE may transmit, to an RRH, a protocol configuration to configure the RRH to perform one or more lower layer functions (e.g., MAC protocol layer functions and/or RLC layer functions) of the UE. The RRH may perform the one or more lower layer functions for communications on behalf of the UE, enabling the UE to perform communications involving higher layer functions (e.g., functions associated with a layer higher than the MAC protocol layer). In this way, an RRH and a UE may enable use of an RRH with a split protocol stack (e.g., a split PHY layer, a split MAC protocol layer, a split RLC layer, and/or the like), enabling communications with potentially higher reliability, reduced interference, reduced dropped communications, and/or the like. Furthermore, the splitting or offloading of MAC and/or RLC functionality to the RRH reduces resource consumption and processing load at the UE and enables lower-latency MAC and RLC processing relative to processing at the UE.

Figure 4:
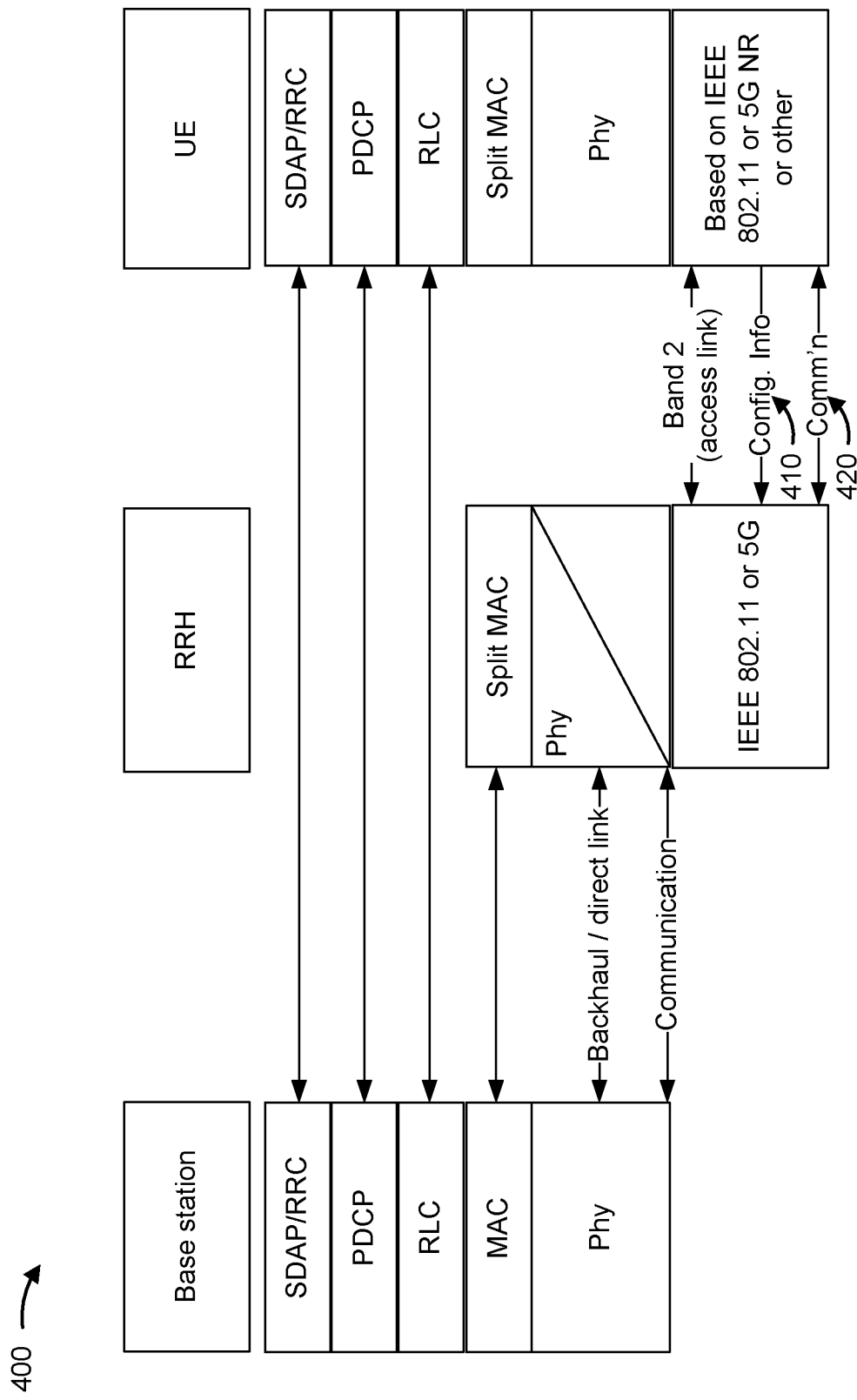
FIGS. 4 and 5 are diagrams illustrating examples associated with remote radio head configuration for a user equipment, in accordance with the present disclosure.

FIG. 4 is a diagram illustrating an example 400 associated with RRH configuration using a split MAC protocol layer, in accordance with the present disclosure.

As shown in FIG. 4, and by example 400, a base station (e.g., base station 110) may be associated with an RRH (e.g., RRH 140, base station 110, relay station 110d, or UE 120) and may communicate with a UE (e.g., UE 120) via the RRH. A protocol stack of the base station may include a service data adaptation protocol (SDAP) or radio resource control (RRC) protocol layer, a packet data convergence protocol (PDCP) protocol layer, a radio link control (RLC) protocol layer, a medium access control (MAC) protocol layer, and a physical (PHY) protocol layer. Similarly, the UE may include an SDAP or RRC layer, a PDCP layer, an RLC layer, a MAC protocol layer, and a PHY layer.

In some aspects, the RRH may include, among other layers, a PHY layer that links the base station to the UE. For example, the RRH may communicate, at the PHY layer, with the base station using a backhaul link or a direct link, and may communicate with the UE using a band 2 access link (e.g., using IEEE 802.11 communications, 5G communications, and/or the like).

As shown by example 400, the RRH is configured with a split MAC protocol layer based at least in part on a protocol configuration (described below). In some aspects, a first portion of MAC signaling may terminate at the RRH and a second portion of MAC signaling may be end-to-end between the base station and the UE. Additionally, or alternatively, rather than a split MAC protocol layer, the RRH may implement a whole MAC protocol layer and perform all MAC processing for the UE based at least in part on the protocol configuration. In this example 400, communications at the RLC layer and higher layers may be end-to-end between the base station and the UE, some portions of PHY layer and/or MAC protocol layer communications may be end-to-end between the base station and the UE, and other portions of PHY layer and/or MAC protocol layer communications may be via a relay using the RRH.

As shown by reference number 410, the UE may transmit, and the RRH may receive, a protocol configuration. In some aspects, the transmission of the protocol configuration may be via an access link between the UE and the RRH (e.g., a band 2 access link). The protocol configuration configures the RRH to perform one or more MAC protocol layer functions of the UE. In some aspects, the UE may transmit the protocol configuration in association with attaching the RRH, such as for an RRH discovery procedure, an attachment procedure, or the like.

In some aspects, the one or more MAC protocol layer functions that are configured to be performed by the RRH may include power headroom reporting and/or buffer status reporting, among other examples. A power headroom value may indicate how much transmission power is left for a UE to use in addition to the power being used by a current transmission. A power headroom report is a type of MAC CE that reports the power headroom between a current UE transmission power (e.g., estimated power), and the nominal power. In some aspects, the power headroom report may be triggered based at least in part on a path loss change (e.g., calculated based on reference signal (RS) power provided by the network and RS power measured at the UE) being greater than a threshold. In some aspects, the power headroom report may be triggered periodically (e.g., based on a timer).

Buffer status reporting may include providing (e.g., in a medium access control control element (MAC CE) to the base station) a buffer status report that indicates how much data is in a UE buffer for transmission. The buffer status report may enable, for example, the base station to allocate resources for UE communications. Multiple types of buffer status reports may be used. For example, a short buffer status report may provide information indicating an amount of data in an uplink buffer for one logical channel group. As another example, a long buffer status report may include information indicating an amount of data in the uplink buffer for all logical channel groups. In some aspects, the buffer status report may be triggered in a variety of ways. For example, a buffer status report may be triggered when the UE has data to transmit in an RLC or PDCP, triggered based on the UE receiving an uplink grant and padding data larger than a size of the buffer status report CE and subheader, and/or triggered, and/or triggered periodically (e.g., based on a timer).

In some aspects, the RRH may be configured to perform all MAC protocol layer functions of the UE. For example, the RRH may be configured to perform power headroom reporting, buffer status reporting, uplink shared channel (SCH) data transfer functions, and/or scheduling requests, among other examples. Example 500 is an example where the RRH is configured to perform all MAC protocol layer functions of the UE (and all RLC layer functions of the UE).

In example 400, an arrow directly between the base station's protocol layer and the UE's protocol layer indicates that functionality of that protocol layer is handled between the UE and the base station with no processing by the RRH. An arrow between the base station's protocol layer and the RRH's protocol layer indicates that the RRH handles one or more functions associated with that protocol layer. For example, in example 400, the RRH handles at least some MAC functions (hence the labeling of the RRH's MAC protocol layer as "split MAC") and at least some PHY functions.

As shown by reference number 420, the UE may perform a communication, where one or more higher layer functions (e.g., for layers higher than the MAC protocol layer) associated with the communication are performed by the UE. For example, the UE may perform functions associated with SDAP, RRC, PDCP, and/or RLC layers. In some aspects, the communication itself is between the UE and the base station, via the RRH and the access link. For example, the RRH may perform the one or more MAC protocol layer functions for the communication between the UE and the base station. In some aspects, for example, the RRH may transmit the buffer status report and/or the power headroom report, among other examples.

In some aspects, the UE may perform, for a communication, a MAC protocol layer function other than the one or more MAC protocol layer functions to be performed by the RRH. For example, the UE may perform any MAC protocol layer functions for which the RRH is not configured (e.g., perform power headroom reporting, buffer status reporting, uplink SCH data transfer functions, and/or scheduling requests, among other examples).

In this way, the splitting or offloading of MAC functionality to the RRH reduces resource consumption and processing load at the UE and enables lower-latency MAC processing relative to processing at the UE.

As indicated above, FIG. 4 is provided as an example. Other examples may differ from what is described with respect to FIG. 4.

Figure 5:
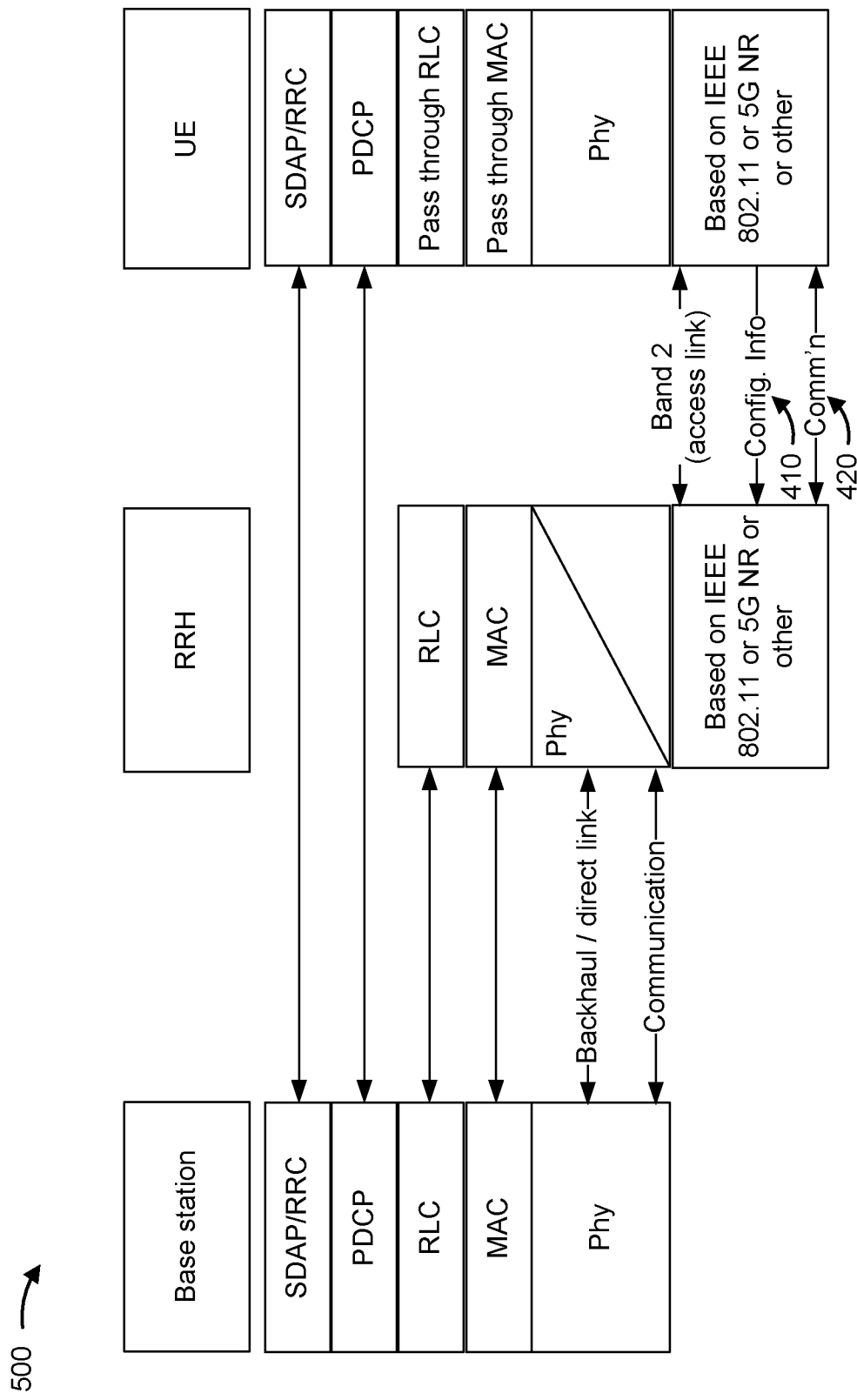

FIG. 5 is a diagram illustrating an example 500 associated with an RRH configuration implementing RLC and MAC functionality at the RRH, in accordance with the present disclosure.

As shown in FIG. 5, and by example 500, in some aspects, the RRH may handle at least a portion of RLC functions. For example, the UE may pass PHY layer, MAC protocol layer, and/or RLC layer (e.g., Layer 2) functionality to the RRH (e.g., via protocol configuration information). Such a protocol architecture may be implemented, for example, for Layer 2 integrated access and backhauling (IAB) deployments.

In some aspects, one or more RLC layer functions are configured to be performed at the RRH based at least in part on the protocol configuration (e.g., the protocol configuration provided to the RRH by the UE). In some aspects, the one or more RLC layer functions include all RLC layer functions of the UE (e.g., transferring protocol data units (PDUs), error correction, RLC service data unit (SDU) segmentation/concatenation/reassembly, duplicate detection, and RLC re-establishment, among other examples). A function that is configured to be performed at the RRH rather than the UE is indicated in FIG. 5 by a "pass-through" label at the UE's protocol stack. "Pass-through" indicates that data associated with the corresponding layer is processed by the RRH and passed through the corresponding layer of the UE without further processing.

In some aspects, the UE may perform an RLC reset based at least in part on attaching to the RRH. In some aspects, the UE may transfer an RLC state to the RRH based at least in part on transmitting the protocol configuration to the RRH. For example, the UE may transfer, to the RRH, data indicating one or more values for variables, constants, timers, and/or other parameters for an RLC state, such as associated with an acknowledged mode or an unacknowledged mode.

As indicated above, FIG. 5 is provided as an example. Other examples may differ from what is described with respect to FIG. 5.

In this way, an RRH and a UE may enable use of an RRH with a split protocol stack (e.g., a split PHY layer, a split MAC protocol layer, a split RLC layer, and/or the like), enabling communications with potentially higher reliability, reduced interference, reduced dropped communications, and/or the like.

FIG. 6 is a diagram illustrating an example process 600 performed, for example, by a UE, in accordance with the present disclosure. Example process 600 is an example where the UE (e.g., UE 120) performs operations associated with techniques for remote radio head configuration for user equipment.

As shown in FIG. 6, in some aspects, process 600 may include transmitting, to an RRH, a protocol configuration, wherein the protocol configuration configures the RRH to perform one or more MAC protocol layer functions of the UE (block 610). For example, the UE (e.g., using transmission component 804, depicted in FIG. 8) may transmit, to an RRH, a protocol configuration, wherein the protocol configuration configures the RRH to perform one or more MAC protocol layer functions of the UE, as described above.

As further shown in FIG. 6, in some aspects, process 600 may include performing a communication, wherein one or more higher layer functions associated with the communication are performed by the UE, wherein the one or more higher layer functions are associated with a higher layer than the MAC protocol layer (block 620). For example, the UE (e.g., using communication component 808, depicted in FIG. 8) may perform a communication, wherein one or more higher layer functions associated with the communication are performed by the UE, wherein the one or more higher layer functions are associated with a higher layer than the MAC protocol layer, as described above.

Process 600 may include additional aspects, such as any single aspect or any combination of aspects described below and/or in connection with one or more other processes described elsewhere herein.

In a first aspect, the one or more MAC protocol layer functions that are configured to be performed by the RRH include power headroom reporting.

In a second aspect, alone or in combination with the first aspect, the one or more MAC protocol layer functions that are configured to be performed by the RRH include all MAC protocol layer functions of the UE.

In a third aspect, alone or in combination with one or more of the first and second aspects, process 600 includes performing, for the communication, a MAC protocol layer function other than the one or more MAC protocol layer functions.

In a fourth aspect, alone or in combination with one or more of the first through third aspects, the MAC protocol layer function includes buffer status reporting.

In a fifth aspect, alone or in combination with one or more of the first through fourth aspects, the MAC protocol layer function includes power headroom reporting.

In a sixth aspect, alone or in combination with one or more of the first through fifth aspects, one or more RLC layer functions are configured to be performed at the RRH based at least in part on the protocol configuration.

In a seventh aspect, alone or in combination with one or more of the first through sixth aspects, the one or more RLC layer functions include all RLC layer functions of the UE.

In an eighth aspect, alone or in combination with one or more of the first through seventh aspects, process 600 includes performing an RLC reset based at least in part on attaching to the RRH.

In a ninth aspect, alone or in combination with one or more of the first through eighth aspects, process 600 includes transferring an RLC state to the RRH based at least in part on transmitting the protocol configuration to the RRH.

In a tenth aspect, alone or in combination with one or more of the first through ninth aspects, the one or more higher layer functions include at least one of a radio link control function, a packet data convergence protocol function, a service data adaptation protocol function, or a radio resource control function.

In an eleventh aspect, alone or in combination with one or more of the first through tenth aspects, the transmission of the protocol configuration is via an access link between the UE and the RRH, and the communication is between the UE and a base station via the RRH and the access link.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by an RRH, in accordance with the present disclosure. Example process 700 is an example where the RRH (e.g., base station 110, relay BS 110d, or UE 120) performs operations associated with techniques for remote radio head configuration for user equipment.

As shown in FIG. 7, in some aspects, process 700 may include receiving, from a UE, a protocol configuration, wherein the protocol configuration configures the RRH to perform one or more MAC protocol layer functions of the UE (block 710). For example, the RRH (e.g., using reception component 902, depicted in FIG. 9) may receive, from a UE, a protocol configuration, wherein the protocol configuration configures the RRH to perform one or more MAC protocol layer functions of the UE, as described above.

As further shown in FIG. 7, in some aspects, process 700 may include performing the one or more MAC protocol layer functions for a communication between the UE and a base station (block 720). For example, the RRH (e.g., using communication component 908, depicted in FIG. 9) may perform the one or more MAC protocol layer functions for a communication between the UE and a base station, as described above.

Process 700 may include additional aspects, such as any single aspect or any combination of aspects described below and/or in connection with one or more other processes described elsewhere herein.

In a first aspect, the one or more MAC protocol layer functions include power headroom reporting.

In a second aspect, alone or in combination with the first aspect, the one or more MAC protocol layer functions include all MAC protocol layer functions of the UE.

In a third aspect, alone or in combination with one or more of the first and second aspects, process 700 includes transmitting buffer status reporting generated by the UE.

In a fourth aspect, alone or in combination with one or more of the first through third aspects, process 700 includes transmitting power headroom reporting generated by the UE.

In a fifth aspect, alone or in combination with one or more of the first through fourth aspects, process 700 includes performing one or more RLC layer functions for the communication based at least in part on the protocol configuration.

In a sixth aspect, alone or in combination with one or more of the first through fifth aspects, the one or more RLC layer functions include all RLC layer functions of the UE.

In a seventh aspect, alone or in combination with one or more of the first through sixth aspects, process 700 includes receiving an RLC state from the UE based at least in part on the protocol configuration.

In an eighth aspect, alone or in combination with one or more of the first through seventh aspects, the reception of the protocol configuration is via an access link between the UE and the RRH, and the communication between the UE and the base station occurs via the RRH and via a backhaul link or a direct link between the RRH and the base station.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
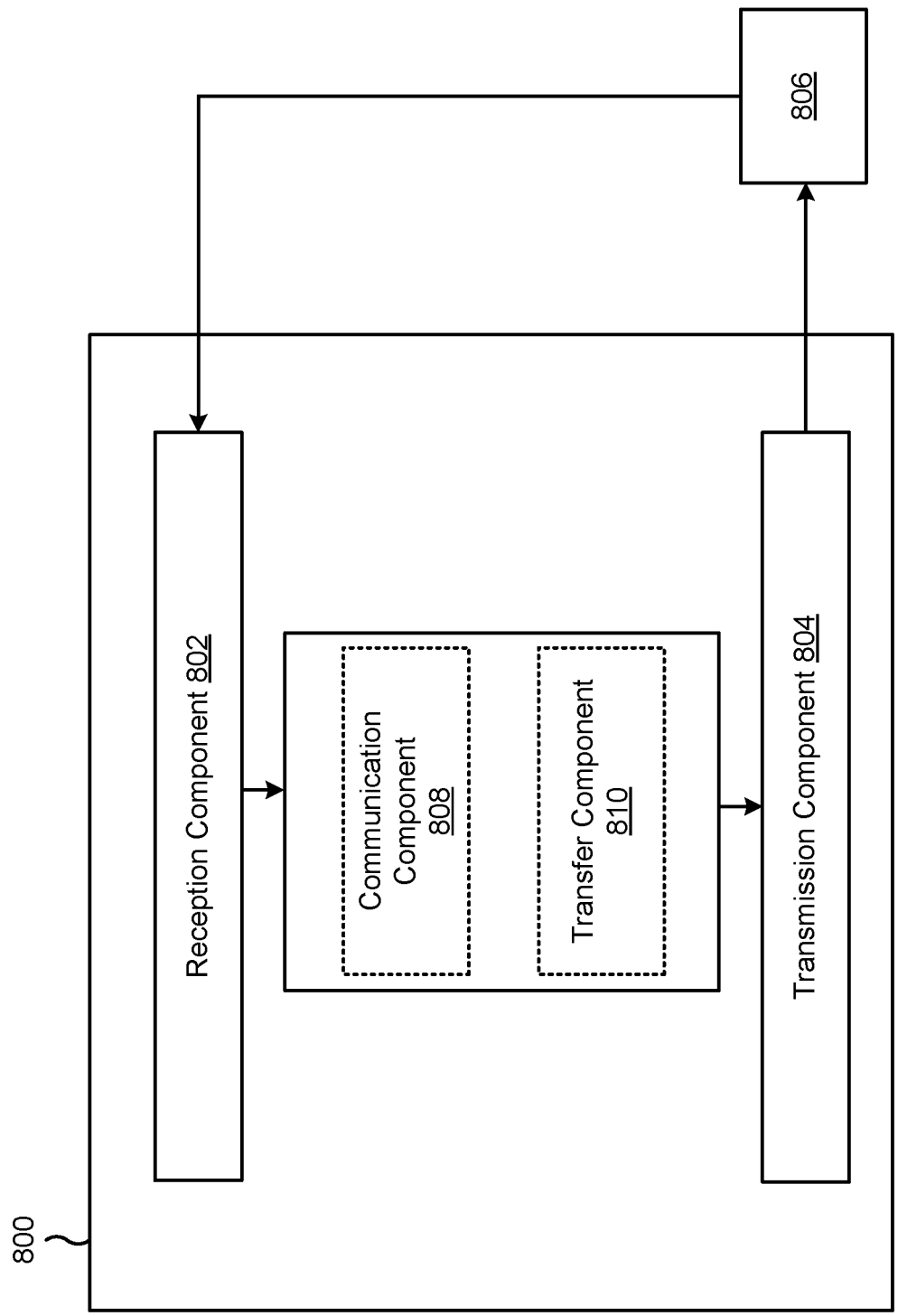
FIGS. 8 and 9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a communication component 808, or a transfer component 810, among other examples.

In some aspects, the apparatus 800 may be configured to perform one or more operations described herein in connection with FIGS. 4 and 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The transmission component 804 may transmit, to an RRH, a protocol configuration, wherein the protocol configuration configures the RRH to perform one or more MAC protocol layer functions of the UE. The communication component 808 may perform a communication, wherein one or more higher layer functions associated with the communication are performed by the UE, wherein the one or more higher layer functions are associated with a higher layer than the MAC protocol layer.

The communication component 808 may perform, for the communication, a MAC protocol layer function other than the one or more MAC protocol layer functions.

The communication component 808 may perform an RLC reset based at least in part on attaching to the RRH.

The transfer component 810 may transfer an RLC state to the RRH based at least in part on transmitting the protocol configuration to the RRH.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
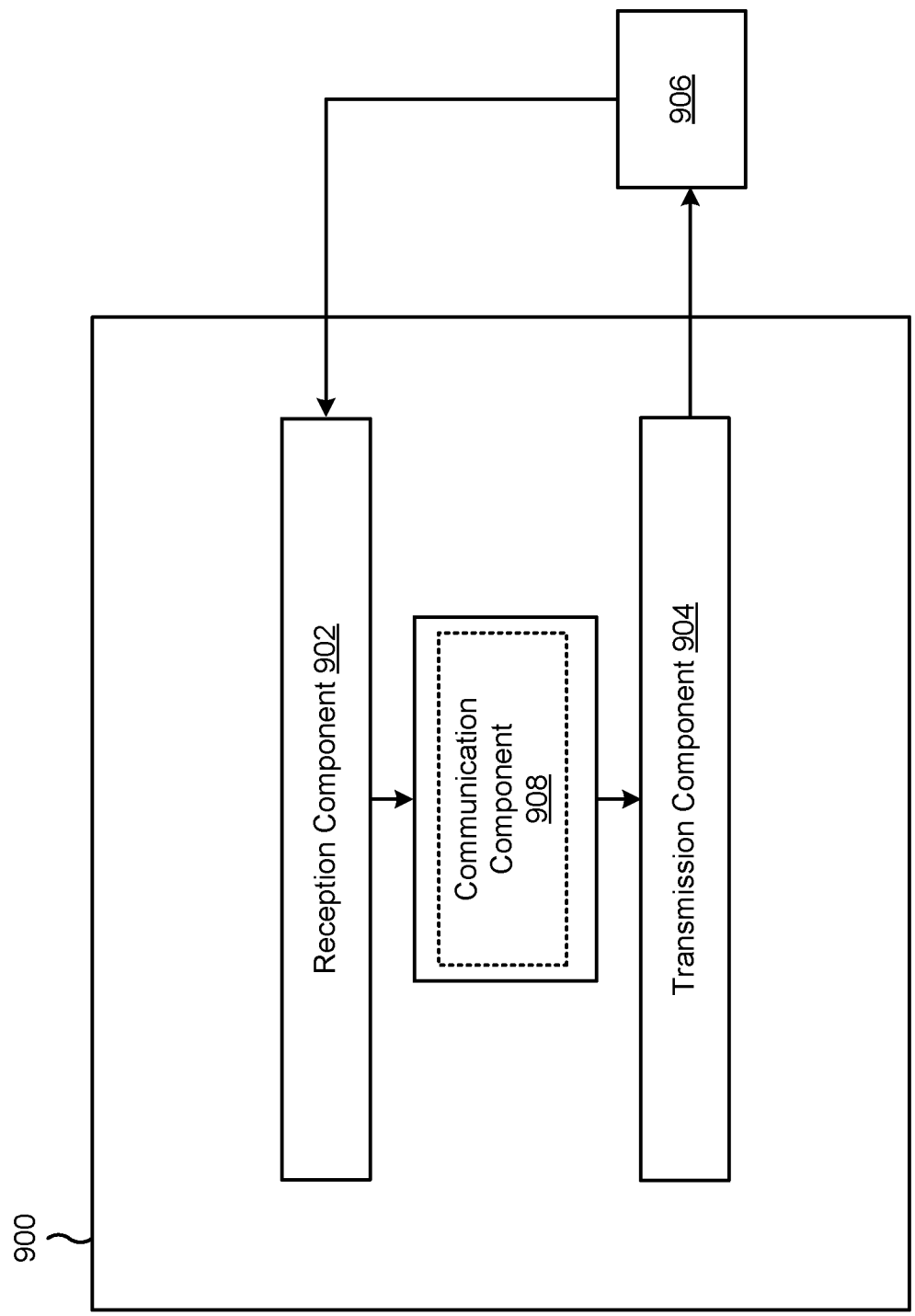

FIG. 9 is a block diagram of an example apparatus 900 for wireless communication. The apparatus 900 may be an RRH, or an RRH may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication component 908.

In some aspects, the apparatus 900 may be configured to perform one or more operations described herein in connection with FIGS. 4 and 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the RRH described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the RRH described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the RRH described above in connection with FIG. 2. In some aspects, the transmission component 904 may be co-located with the reception component 902 in a transceiver.

The reception component 902 may receive, from a UE, a protocol configuration, wherein the protocol configuration configures the RRH to perform one or more MAC protocol layer functions of the UE. The communication component 908 may perform the one or more MAC protocol layer functions for a communication between the UE and a base station.

The transmission component 904 may transmit buffer status reporting generated by the UE.

The transmission component 904 may transmit power headroom reporting generated by the UE.

The communication component 908 may perform one or more RLC layer functions for the communication based at least in part on the protocol configuration.

The reception component 902 may receive an RLC state from the UE based at least in part on the protocol configuration.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: transmitting, to a remote radio head (RRH), a protocol configuration, wherein the protocol configuration configures the RRH to perform one or more MAC protocol layer functions of the UE; and performing a communication, wherein one or more higher layer functions associated with the communication are performed by the UE, wherein the one or more higher layer functions are associated with a higher layer than the MAC protocol layer.

Aspect 2: The method of Aspect 1, wherein the one or more MAC protocol layer functions that are configured to be performed by the RRH include power headroom reporting.

Aspect 3: The method of any of Aspects 1-2, wherein the one or more MAC protocol layer functions that are configured to be performed by the RRH include all MAC protocol layer functions of the UE.

Aspect 4: The method of any of Aspects 1-3, further comprising: performing, for the communication, a MAC protocol layer function other than the one or more MAC protocol layer functions.

Aspect 5: The method of Aspect 4, wherein the MAC protocol layer function includes buffer status reporting.

Aspect 6: The method of Aspect 4, wherein the MAC protocol layer function includes power headroom reporting.

Aspect 7: The method of any of Aspects 1-6, wherein one or more radio link control (RLC) protocol layer functions are configured to be performed at the RRH based at least in part on the protocol configuration.

Aspect 8: The method of Aspect 7, wherein the one or more RLC layer functions include all RLC layer functions of the UE.

Aspect 9: The method of Aspect 7, further comprising: performing an RLC reset based at least in part on attaching to the RRH.

Aspect 10: The method of Aspect 7, further comprising: transferring an RLC state to the RRH based at least in part on transmitting the protocol configuration to the RRH.

Aspect 11: The method of any of Aspects 1-10, wherein the one or more higher layer functions include at least one of: a radio link control function, a packet data convergence protocol function, a service data adaptation protocol function, or a radio resource control function.

Aspect 12: The method of any of Aspects 1-11, wherein the transmission of the protocol configuration is via an access link between the UE and the RRH, and wherein the communication is between the UE and a base station via the RRH and the access link.

Aspect 13: A method of wireless communication performed by a remote radio head (RRH), comprising: receiving, from a user equipment (UE), a protocol configuration, wherein the protocol configuration configures the RRH to perform one or more MAC protocol layer functions of the UE; and performing the one or more MAC protocol layer functions for a communication between the UE and a base station.

Aspect 14: The method of Aspect 13, wherein the one or more MAC protocol layer functions include power headroom reporting.

Aspect 15: The method of Aspects 13 or 14, wherein the one or more MAC protocol layer functions include all MAC protocol layer functions of the UE.

Aspect 16: The method of Aspect 15, further comprising: transmitting buffer status reporting generated by the UE.

Aspect 17: The method of Aspect 15, further comprising: transmitting power headroom reporting generated by the UE.

Aspect 18: The method of any of Aspects 13-17, further comprising:
  performing one or more radio link control (RLC) protocol layer functions for the communication based at least in part on the protocol configuration.

Aspect 19: The method of Aspect 18, wherein the one or more RLC layer functions include all RLC layer functions of the UE.

Aspect 20: The method of Aspect 18, further comprising: receiving an RLC state from the UE based at least in part on the protocol configuration.

Aspect 21: The method of any of Aspects 13-20, wherein the reception of the protocol configuration is via an access link between the UE and the RRH, and wherein the communication between the UE and the base station occurs via the RRH and via a backhaul link or a direct link between the RRH and the base station.

Aspect 22: An apparatus for wireless communication at a device, comprising a processor; memory coupled with the processor; and instructions stored in the memory and executable by the processor to cause the apparatus to perform the method of one or more Aspects of Aspects 1-12.

Aspect 23: An apparatus for wireless communication at a device, comprising a processor; memory coupled with the processor; and instructions stored in the memory and executable by the processor to cause the apparatus to perform the method of one or more Aspects of Aspects 13-21.

Aspect 24: A device for wireless communication, comprising a memory and one or more processors coupled to the memory, the memory and the one or more processors configured to perform the method of one or more Aspects of Aspects 1-12.

Aspect 25: A device for wireless communication, comprising a memory and one or more processors coupled to the memory, the memory and the one or more processors configured to perform the method of one or more Aspects of Aspects 13-21.

Aspect 26: An apparatus for wireless communication, comprising at least one means for performing the method of one or more Aspects of Aspects 1-12.

Aspect 27: An apparatus for wireless communication, comprising at least one means for performing the method of one or more Aspects of Aspects 13-21.

Aspect 28: A non-transitory computer-readable medium storing code for wireless communication, the code comprising instructions executable by a processor to perform the method of one or more Aspects of Aspects 1-12.

Aspect 29: A non-transitory computer-readable medium storing code for wireless communication, the code comprising instructions executable by a processor to perform the method of one or more Aspects of Aspects 13-21.

Aspect 30: A non-transitory computer-readable medium storing a set of instructions for wireless communication, the set of instructions comprising one or more instructions that, when executed by one or more processors of a device, cause the device to perform the method of one or more Aspects of Aspects 1-12.

Aspect 31: A non-transitory computer-readable medium storing a set of instructions for wireless communication, the set of instructions comprising one or more instructions that, when executed by one or more processors of a device, cause the device to perform the method of one or more Aspects of Aspects 13-21.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   transmitting, to a remote radio head (RRH) for an RRH discovery or an attachment, a protocol configuration, wherein the protocol configuration configures the RRH to perform one or more medium access control (MAC) protocol layer functions and one or more physical layer functions of the UE;
   attaching to the RRH in accordance with transmission of the protocol configuration; and
   performing a communication, wherein:
      one or more higher layer functions associated with the communication are configured to be performed by the UE,
      the one or more higher layer functions are associated with a higher layer than the MAC protocol layer,
      a portion of MAC signaling associated with the communication is configured to terminate at the RRH based at least in part on the protocol configuration, and
      one or more MAC protocol layer functions and one or more physical layer functions associated with the communication are configured to be performed by the RRH based at least in part on the protocol configuration.

2. The method of claim 1, wherein the one or more MAC protocol layer functions that are configured to be performed by the RRH include power headroom reporting.

3. The method of claim 1, wherein the one or more MAC protocol layer functions that are configured to be performed by the RRH include all MAC protocol layer functions of the UE.

4. The method of claim 1, further comprising:
   performing, for the communication, a MAC protocol layer function other than the one or more MAC protocol layer functions configured to be performed by the RRH.

5. The method of claim 4, wherein the MAC protocol layer function includes buffer status reporting.

6. The method of claim 4, wherein the MAC protocol layer function includes power headroom reporting.

7. The method of claim 1, wherein one or more radio link control (RLC) protocol layer functions associated with the UE are configured to be performed at the RRH based at least in part on the protocol configuration.

8. The method of claim 7, wherein the one or more RLC layer functions include all RLC layer functions of the UE.

9. The method of claim 1, further comprising:
   performing a radio link control (RLC) reset based at least in part on attachment to the RRH.

10. The method of claim 1, further comprising:
    transferring a radio link control (RLC) state to the RRH based at least in part on transmitting the protocol configuration to the RRH.

11. The method of claim 1, wherein the one or more higher layer functions include at least one of:
    a radio link control function,
    a packet data convergence protocol function,
    a service data adaptation protocol function, or
    a radio resource control function.

12. The method of claim 1, wherein the transmission of the protocol configuration is via an access link between the UE and the RRH, and wherein the communication is between the UE and a base station via the RRH and the access link.

13. A method of wireless communication performed by a remote radio head (RRH), comprising:
    receiving, from a user equipment (UE) for an RRH discovery or an attachment, a protocol configuration, wherein the protocol configuration configures the RRH to perform one or more medium access control (MAC) protocol layer functions and one or more physical layer functions for the UE;
    attaching to the UE in accordance with reception of the protocol configuration; and
    performing, based at least in part on the protocol configuration, the one or more MAC protocol layer functions and the one or more physical layer functions associated with the UE for a communication between the UE and a base station, wherein a portion of MAC signaling associated with the communication is configured to terminate at the RRH based at least in part on the protocol configuration.

14. The method of claim 13, wherein the one or more MAC protocol layer functions include power headroom reporting.

15. The method of claim 13, wherein the one or more MAC protocol layer functions include all MAC protocol layer functions of the UE.

16. The method of claim 15, further comprising:
    transmitting buffer status reporting generated by the UE.

17. The method of claim 15, further comprising:
    transmitting power headroom reporting generated by the UE.

18. The method of claim 13, further comprising:
    performing one or more radio link control (RLC) protocol layer functions associated with the UE for the communication based at least in part on the protocol configuration.

19. The method of claim 18, wherein the one or more RLC layer functions include all RLC layer functions of the UE.

20. The method of claim 13, further comprising:
    receiving a radio link control (RLC) state from the UE based at least in part on the protocol configuration.

21. The method of claim 13, wherein the reception of the protocol configuration is via an access link between the UE and the RRH, and wherein the communication between the UE and the base station occurs via the RRH and via a backhaul link or a direct link between the RRH and the base station.

22. The method of claim 13, further comprising:
performing the one or more MAC protocol layer functions associated with the UE based at least in part on the RRH being idle.

23. A user equipment (UE) for wireless communication, comprising:
one or more memories; and
one or more processors, coupled to the one or more memories, configured to:
transmit, to a remote radio head (RRH) for an RRH discovery or an attachment, a protocol configuration, wherein the protocol configuration configures the RRH to perform one or more medium access control (MAC) protocol layer functions and one or more physical layer functions for the UE;
attach to the RRH in accordance with transmission of the protocol configuration; and
perform a communication, wherein:
one or more higher layer functions associated with the communication are configured to be performed by the UE,
the one or more higher layer functions are associated with a higher layer than the MAC protocol layer,
a portion of MAC signaling associated with the communication is configured to terminate at the RRH based at least in part on the protocol configuration, and
one or more MAC protocol layer functions and one or more physical layer functions associated with the communication are configured to be performed by the RRH based at least in part on the protocol configuration.

24. The UE of claim 23, wherein the one or more MAC protocol layer functions that are configured to be performed by the RRH include all MAC protocol layer functions of the UE.

25. The UE of claim 23, wherein the one or more processors are further configured to:
perform, for the communication, a MAC protocol layer function other than the one or more MAC protocol layer functions configured to be performed by the RRH.

26. The UE of claim 23, wherein one or more radio link control (RLC) protocol layer functions associated with the UE are configured to be performed at the RRH based at least in part on the protocol configuration.

27. The UE of claim 23, wherein the one or more processors are further configured to:
transfer a radio link control (RLC) state to the RRH based at least in part on transmitting the protocol configuration to the RRH.

28. A remote radio head (RRH) for wireless communication, comprising:
one or more memories; and
one or more processors, coupled to the one or more memories, configured to:
receive, from a user equipment (UE) for an RRH discovery or an attachment, a protocol configuration, wherein the protocol configuration configures the RRH to perform one or more medium access control (MAC) protocol layer functions and one or more physical layer functions for the UE;
attach to the UE in accordance with reception of the protocol configuration; and
perform, based at least in part on the protocol configuration, the one or more MAC protocol layer functions and the one or more physical layer functions associated with the UE for a communication between the UE and a base station, wherein a portion of MAC signaling associated with the communication is configured to terminate at the RRH based at least in part on the protocol configuration.

29. The RRH of claim 28, wherein the one or more MAC protocol layer functions include all MAC protocol layer functions of the UE.

30. The RRH of claim 28, wherein the one or more processors are further configured to:
perform one or more radio link control (RLC) protocol layer functions associated with the UE for the communication based at least in part on the protocol configuration.

* * * * *